US011715968B2

(12) United States Patent
Rodrigues Mansano et al.

(10) Patent No.: US 11,715,968 B2
(45) Date of Patent: Aug. 1, 2023

(54) HYBRID ELECTRICAL POWER SUPPLY CONTROL SYSTEM FOR PROVIDING ELECTRICAL ENERGY TO A LOAD, AS WELL AS A CORRESPONDING METHOD AND A SENSOR COMPRISING SUCH CONTROL SYSTEM

(71) Applicant: NOWI ENERGY B.V., Delft (NL)

(72) Inventors: Andre Luis Rodrigues Mansano, Delft (NL); Omar Vince Link, Delft (NL); Simon Van Der Jagt, Delft (NL); Mario Lizana Calvo, Delft (NL)

(73) Assignee: NOWI ENERGY B.V., Delft (NL)

( * ) Notice: Subject to any disclaimer, the term of this patent is extended or adjusted under 35 U.S.C. 154(b) by 108 days.

(21) Appl. No.: 16/755,797

(22) PCT Filed: Oct. 12, 2018

(86) PCT No.: PCT/NL2018/050672
§ 371 (c)(1),
(2) Date: Apr. 13, 2020

(87) PCT Pub. No.: WO2019/074369
PCT Pub. Date: Apr. 18, 2019

(65) Prior Publication Data
US 2021/0408821 A1 Dec. 30, 2021

(30) Foreign Application Priority Data

Oct. 13, 2017 (NL) ...................................... 2019730

(51) Int. Cl.
*H02J 7/34* (2006.01)
*H02J 50/00* (2016.01)
(Continued)

(52) U.S. Cl.
CPC .............. *H02J 7/345* (2013.01); *H02J 3/381* (2013.01); *H02J 9/04* (2013.01); *H02J 50/001* (2020.01);
(Continued)

(58) Field of Classification Search
CPC .... H02J 7/345; H02J 3/381; H02J 9/04; H02J 50/001; H02J 7/35; H02J 2300/22;
(Continued)

(56) References Cited

U.S. PATENT DOCUMENTS

2004/0232878 A1* 11/2004 Couch ....................... H02J 1/14
320/101
2010/0156457 A1* 6/2010 Greene ............ H03K 19/17784
326/62
(Continued)

OTHER PUBLICATIONS

International Search Report dated Feb. 21, 2019 for PCT/NL2018/050672.

*Primary Examiner* — Lincoln D Donovan
*Assistant Examiner* — Alex W Lam
(74) *Attorney, Agent, or Firm* — Ruggiero, McAllister & McMahon LLC (57) ABSTRACT

A hybrid electrical power supply control system for providing electrical energy to at least one load. The load may alternate between a first low energy consuming operational modus and a second high energy consuming operational modus. The control system may include a first power source comprising at least one battery unit and a second power source comprising at least one energy harvesting unit and arranged to harvest and convert energy into Direct Current, DC, energy, and wherein the converted DC energy is stored in a charge collecting unit. The control system further includes an operational modus detecting unit and a power source switching unit, connected to the operational modus
(Continued)

detecting unit and arranged to alternately connect the first power source and the second power source to the load.

19 Claims, 4 Drawing Sheets

(51) Int. Cl.
  *H02J 3/38* (2006.01)
  *H02J 9/04* (2006.01)
  *H02J 7/35* (2006.01)
(52) U.S. Cl.
  CPC .............. *H02J 7/35* (2013.01); *H02J 2300/22* (2020.01); *H02J 2300/28* (2020.01)

(58) Field of Classification Search
  CPC .. H02J 2300/28; H02J 7/0024; H01M 16/003; H01M 10/46
  See application file for complete search history.

(56) References Cited

U.S. PATENT DOCUMENTS

| | | | |
|---|---|---|---|
| 2012/0068669 A1* | 3/2012 | Trainor | H01M 16/003 320/167 |
| 2013/0009548 A1* | 1/2013 | Liu | H05B 41/2855 315/127 |
| 2014/0141713 A1* | 5/2014 | Shirinfar | H01Q 3/00 455/25 |
| 2017/0170675 A1 | 6/2017 | Ni Scanaill et al. | |
| 2017/0244268 A1 | 8/2017 | Villar Pique et al. | |

* cited by examiner

HYBRID ELECTRICAL POWER SUPPLY CONTROL SYSTEM FOR PROVIDING ELECTRICAL ENERGY TO A LOAD, AS WELL AS A CORRESPONDING METHOD AND A SENSOR COMPRISING SUCH CONTROL SYSTEM

TECHNICAL FIELD

The present disclosure is generally related to hybrid electrical power supply control systems for providing electrical energy to a load having at least two different types of energy sources capable of supplying energy to one or more loads.

BACKGROUND

Especially with the rapid increase in popularity of Internet of Things, IoT, the number of interconnected devices is expected to exceed 100 billion within several years from now. Most of these connected devices are IoT or IoT like sensors. These sensors need power supplies to operate. Most of the energy of these sensors is provided by battery cells. Use of such battery powered sensors have limited lifetime expectance since most sensors operate in either a low power sleep operational modus or in a high-power wake or system running operational modus.

During the low power sleep modus, the sensor will only require a very low amount of energy and hence will only draw a minimal current from the battery. During the wake or system running modus the energy requirement is however high and as such, the sensor, acting as a load for the power supply, draws high peaks of current from the battery.

Research has shown that such alternating high and low energy consuming operational modus has a significant impact on the lifetime of the batteries. If the battery is subject to such short high peak currents, independent from the average current drawn by the load, the lifetime of the battery rapidly reduces. Such reduced lifetime of the battery limits the use of the sensor devices. Most sensors are especially suitable for applications in which they require low maintenance. However, with the reduced lifetime of the battery, the sensor devices would still require regular maintenance, adding up to the cost of ownership of the sensor devices.

In view of the above, known sensor devices have the drawback of limited battery lifetime.

SUMMARY

It is an object of the present invention to obtain a battery powered sensor device wherein the battery lifetime is significantly improved. It is another object of the present invention to obtain a corresponding method of controlling the power supply of a battery powered sensor device as well as such a sensor device comprising such a power supply.

This object is, in a first aspect of the disclosure, achieved by a hybrid electrical power supply control system for providing electrical energy to at least one load. The at least one load being for example an IoT sensor device which alternates between a first low energy consuming operational modus and second high energy consuming operational modus.

The hybrid electrical power supply control system comprises:
- a first power source comprising at least one battery unit and arranged to be switched to the load for supplying electrical energy;
- a second power source comprising at least one energy harvesting unit and arranged to harvest and convert energy into Direct Current, DC, energy, and wherein said converted DC energy is stored in a charge collecting unit, and wherein said second power source is further arranged to be switched to said load for supplying electrical energy.

The hybrid electrical power supply control system further comprises:
- some operational modus detecting unit, arranged for detecting whether the load being in the first or in the second operational modus;
- a power source switching unit, connected to the operational modus detecting unit for receiving the detected first or second operational modus of the load.

Moreover, the hybrid electrical power supply control system is arranged to connect the first power source to the load upon the load being detected to be in the first low energy consuming operational modus, and arranged to connect the second power source to the load upon the load being detected to be in the second high energy consuming operational modus.

The second high energy consuming operational modus is defined by the detecting of a current peak drawn by the load. This is detected by the operational modus detecting unit.

The power source switching unit is also arranged to charge the charge collecting unit, e.g. the super capacitor, of the second power source with the battery of the first power source.

The present disclosure is based on the concept that the different levels of energy requirements and hence the different levels of current being drawn by the sensor device from a power supply require different types of power storage units. Two operational mode can be distinguished, one in which the sensor device is in a sleep modus, waiting for the device to wake-up and for example perform some sort of measurement and subsequently store or communicate the measured value, and the other in which the sensor device is actually in a system running modus wherein a measurement or other processing task takes place.

During the sleep modus, the sensor devices only requires low power, just sufficient to keep the device from a full shutdown. The current level being drawn during this modus is very low, somewhere in the order of a couple of micro-Ampère. During the wake-up modus however, the system is fully up and running and consumes very high peak currents in the order of a 10-100's mili Ampère. Although this high peak current is only for a short time duration, and conventional batteries can supply such a current, it has a significant negative effect on the lifetime of the battery.

The present disclosure is based on the concept that different power consumption modus requires different types of power supplies. Whereas a battery power supply is very suitable to be used as a power supply during the low current consumption modus, a storage capacitor is better suitable during the high current consumption modus in order to protect the battery.

The battery may be connectable to the storage capacitor, for the purpose of charging the capacitor prior to the high current consumption system running modus, but that would still be inefficient for the battery. The inventors found that the use of an energy harvesting unit for charging the storage capacitor does not have such drawbacks. The energy harvesting unit may be arranged to harvest and convert energy into Direct Current, DC, energy, and wherein said converted DC energy is stored in a charge collecting unit, The hybrid electrical power supply control system according to the first aspect of the invention comprises a power source switching unit that is connected to some operational modus detecting unit for receiving a signal on the basis of which the unit may detect if the load, e.g. the sensor device, is in the first or second, and hence low or high current operational modus.

If the load is determined to be in the low current operational modus, e.g. the sleep modus of the sensor device, then the power source switching unit may connect the first power source that comprises a battery, to the load. If the load is however determined to be in a high current operational modus, e.g. the system running modus, then the power switching unit may connect the second power source that comprises the energy harvesting unit with the storage capacitor to the load. As such, the battery is protected from the high current peaks during the system running operational modus and due to the use of an energy harvesting unit, the energy used during the system running modus does not need to be provided by the battery but is obtained by converted, incident RF signals or any other harvested energy, thereby preventing both lifetime reduction of the battery and decreasing battery power consumption as well.

It was an insight of the inventor that a high current of the power peak should be prevented when the load is connected to the battery of the second power supply. To this end, the operational modus detecting unit measures a high power peak based on detecting a current peak.

The charging of the charge collecting unit could be instable due to environmental conditions such as the presence and activity of RF signals in case of an RF energy harvester, or the presence of sunlight in case of a solar energy harvester. To assure that the high current drawn by the load in the high energy modus is provided by the charge collecting unit at all time, it is beneficial to charge the charge collecting unit with the battery if necessary to prevent that the high current is drawn from the battery, which significantly reduces the lifetime of the battery.

In an example, said power source switching unit is arranged to compare a voltage level Veh of said charge collecting unit with a predetermined reference voltage level Vref, and wherein said power source switching unit being further arranged to charge said charge collecting unit with said at least one battery unit of said first power source when Veh drops below Vref, One example of detecting when to charge the charge collecting unit with the battery is when voltage over the charge collecting units drops below a threshold value. If this occurs, then the charge in the capacitor is too low to supply sufficient power to the load during the next high energy cycle, and the capacitor is charged by the battery to prevent power outage or power, e.g. a high current peak, being drawn from the battery.

In an further example, said power source switching unit is further arranged to charge said charge collecting unit with said at least one battery unit of said first power source when a real time counter finishes a first low energy time counter.

In yet another example, said power source switching unit is further arranged to charge said charge collecting unit with said at least one battery unit of said first power source when an external wakeup signal is received.

The consecutive periods of low and high power operational modus can be predefined, for example by regular, fixed intervals. In an example, this could be a period of 1 millisecond of high power operational modus, followed by a period of 1 second of low power operational modus. This foreseeability can be used to define when the next cycle of high power operational modus will occur. Hence, the system can be arranged to measure, at a certain time prior to the high power operational modus, if the charge in the capacitor is sufficient to power the next high power operational modus. If not, then the battery may charge the capacitor. This could be embodied by a timer that finishes in which the timer is set in correspondence with these regular intervals of subsequent high and lower power operational modus.

As an alternative to the foreseeability and the timer, the system could also be initiated by an external signal, for example by a microprocessor in the sensor for which the hybrid power supply provides its power. The microprocessor is set to have certain wakeup and sleep modus, i.e. high and low power modus. And prior to the high power modus, or after the low power modus, the microprocessor may provide a wakeup signal as an external trigger to check if the capacitor has sufficient power to provide power for the next high power cycle.

In a preferred example, the system operates with a combination of the above. Hence, power source switching unit charges the capacitor of the second power source from the battery of the first only if a low voltage condition is detected and the timer detects that the capacitor is already low for a predetermined period of time.

In an example, said operational modus detecting unit is arranged for detecting a current peak drawn by said load based on a voltage differential over an electrical resistance.

In an example, said operational modus detecting unit comprises an electrical resistance and an in series connected capacitance.

In example, operational modus detecting unit, e.g. an electrical resistance and an in series connected capacitance, is connected in parallel to the capacitor of the second power source, i.e. the charge collecting unit. This has the advantage that zero or minimal current flows trough the components of the operational modus detecting unit in any condition other than the high current peak drawn by the load. Hence, most of the time, the operational modus detecting unit itself consumes very little energy. Only in the event of the high current peak, a current will flow through the components, which results in a voltage over the electrical resistance which can be measured to define that the system is in the second high power operational modus.

In an example, the energy harvesting unit is arranged to harvest energy from an external source, and wherein said external source comprises any one or more of the group consisting of: ambient energy, kinetic energy, solar power, thermal energy, wind energy, salinity gradients and energy from electromagnetic radiation.

In an example, the energy harvesting unit is arranged to convert incident radio frequency, RF, energy associated with an RF signal to Direct Current, DC, energy, wherein said converted DC energy is stored in a charge collecting unit, and arranged to be switched to said load for supplying electrical energy.

In the most basic embodiment, the hybrid electrical power supply control system according to the invention is arranged to comprise any type of energy harvesting unit. Hence, energy that is collected, harvested or accumulated by motion or kinetic energy in general, or by ambient energy from the environment, e.g. by energy from incident radio frequency energy such as from Wi-Fi, 2G, 3G, 4G and other GSM standardized or non-standardized signals.

In an example, the power source switching unit is arranged to compare a voltage level $V_{eh}$ of said charge collecting unit with a predetermined reference voltage level $V_{ref}$, said power source switching unit being further arranged to charge said charge collecting unit by said battery unit of said first power source when $V_{eh}$ value is below $V_{ref}$, and to charge said charge collecting unit by said energy harvesting unit of said second power source when $V_{eh}$ exceeds $V_{ref}$.

The power source switching unit may be have a preferred working mode wherein the power bus, Vbus to which the load is connected, is connected to the battery upon sleep mode and to a charge collecting unit such as a storage capacitor when the system wakes up and consumes high peaks of energy, i.e. draws high peaks of current. The storage capacitor is charged primarily by the energy harvesting unit but in an example, the storage capacitor may however not have harvested sufficient energy and thus comprise a sufficient high voltage level to supply the peak current needed at the system start-up. In that case, the power source switching unit is arranged to charge the storage capacitor, in particular with a (limited) current level, e.g. through use of a current controller, provided by the battery.

In an example, the power source switching unit is arranged to compare a voltage level $V_{eh}$ of the charge collecting unit with a predetermined reference voltage level $V_{ref}$, the power source switching unit being further arranged to charge the charge collecting unit by the battery unit of the first power source when $V_{eh}$ drops below $V_{ref}$, and to charge the charge collecting unit by the energy harvesting unit of the second power source when $V_{eh}$ exceeds $V_{ref}$.

In an example, the control system further comprises a power source bus for connecting the load and wherein the power source bus is alternately connectable to the first and second power sources, through control of the power source switching unit.

Preferably, the load may be connected to a power source bus that functions as a central power line connection for both battery and the energy harvesting unit or more particular, the charge collecting unit (storage capacitor), on the input side, and the load on the output side. The control system may be arranged to switch between both for example through integrated components such as transistors, (mos.)fets or the like. The skilled person will appreciate what other types of electronic switching means may be applicable.

In an example, the power source bus comprises a further charge collecting unit for maintaining a voltage level of the power source bus upon the power source switching unit switching the power source bus between the first and second power source.

In between the switching of the two power sources, the load may become powerless for a small time period. The power source bus may be comprised of a further (small) charge collecting unit such as a capacitor to maintain the voltage level (at least up to a sufficient level to prevent the load from correct functioning) of the power source bus for the load.

In an example, at least one of the charge collecting unit and the further charge collecting unit comprise a storage capacitor.

The charge collecting unit and/or further charge collecting unit may consist of one or more capacitor(s).

In an example, the control system further comprises a current controlling unit for charging the charge collecting unit by the battery of the first power source at a predetermined limited current level.

In an example, the first power source further comprises a current filter for limiting the current being drawn from the battery by a predetermined limited current level, and wherein the current filter in particular is comprised of an LC circuit.

The current filter may be present to smoothen the current of the battery, this may in a simple embodiment be performed by an LC circuit, an integrated circuit, digital component or the like.

In an example, the power source switching unit comprises a microcontroller having a real time counter unit and being arranged to determine a voltage level over the charge collecting unit, and wherein the power source switching unit is arranged to switch from the first to the second power sources upon both the real time counter unit exceeding a predetermined value and the determined voltage level over the charge collecting unit exceeding a predetermined threshold value.

The control of whether the first or second power source, hence, the battery, or energy harvesting unit, is switched to the load may be done by existence of a real time counter in a microcontroller that is also arranged to determine the voltage of the capacitor connected to the energy harvesting unit, hence the charge collecting unit or storage capacitor. Both sources of energy may be switched if the real time counter finishes the sleep mode time count and the voltage across the storage capacitor is sufficient enough to supply enough energy for the peak current drawn by the load during the system start-up.

In an example, the predetermined threshold value of the charge collecting unit corresponds to a predetermined peak current drawn by the load in the second high energy consuming operational modus.

More in particular, the voltage across the charge collecting unit or storage capacitor may be compared with a predetermined voltage level to set the level at which it is in that sufficient peak current can be supplied during the start-up of the load.

In an example, the power source switching unit is arranged to determine a voltage level of the first power source and further being arranged to switch from the first to the second power sources upon the determined voltage level of the first power source to drop below a predetermined threshold value.

The power source switching unit may be arranged to have the load draw the energy from the second power source, hence the energy harvesting unit, when the battery is too low. This way the power source may function as a power supply unit that consists of a primary power source as well as a backup power source if the primary fails, is empty or does not function correctly for whatever reason.

In an example, the power source switching unit comprises a comparator having the determined voltage level of the first power source, the determined voltage level of the second power source, and the corresponding predetermined threshold values connected to inputs of the comparator and wherein the comparator output is connected the first and second power source for switching between the first to the second power sources in correspondence with the voltage levels of the comparator inputs.

The power source switching unit may also comprise a comparator, for example an operational amplifier that compares at least two input voltages to switch between the first and second power source when the voltage of one of the inputs exceeds a second, and switches back to the other state when the second input voltage exceeds the first.

In a second aspect of the invention, a method is proposed of controlling a hybrid electrical power supply system for providing electrical energy to a load, the load alternating between a first low energy consuming operational modus and second high energy consuming operational modus, and wherein the hybrid electrical power system comprises a first power source comprising at least one battery unit being arranged to be switched to the load for supplying electrical energy, a second power source comprising at least one energy harvesting unit and arranged to harvest and convert energy into Direct Current, DC, energy, and wherein said converted DC energy is stored in a charge collecting unit, and wherein said second power source is further arranged to be switched to said load for supplying electrical energy, the method comprising the steps of:

- detecting, by an operational modus detecting unit, an operational modus of the load being in the first low energy consuming operational modus or in the second high energy consuming operational modus;
- receiving, by a power source switching unit being connected to the operational modus detecting unit, the detected first or second operational modus of the load;
- connecting, by the power source switching unit, the first power source to the load upon the load being detected to be in the first low energy consuming operational modus;
- connecting, by the power source switching unit, the second power source to the load upon the load being detected to be in the second high energy consuming operational modus.

In a further example, the energy harvesting unit is arranged to convert incident radio frequency, RF, energy associated with an RF signal to Direct Current, DC, energy.

In a third aspect of the invention, a sensor device is proposed that comprises:

- a hybrid electrical power supply control system according to any of the descriptions above;
- an energy harvesting unit arranged to harvest and convert energy into Direct Current, DC, energy, wherein said converted DC energy is stored in a charge collecting unit, and wherein said second power source is further arranged to be switched to said sensor for supplying electrical energy thereto;
- a sensor for performing a measurement.

In a further example, the energy harvesting unit comprises an antenna connected to via rectifier to said energy harvesting unit of said hybrid electrical power supply control system, wherein said antenna is arranged for receiving said RF signal.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

It is estimated that within a few years from now the world will go from 7 billion to at least 200 billion connected devices. The majority of these devices are some sort of sensor devices, e.g. Internet of Things, IoT or IoT like devices. All these sensor devices need power and thus powering of all these devices is a big issue within the next few years.

Currently sensors are mainly powered by batteries or by fixed power lines. At the enormous scale of IoT sensor deployment cables are simply impractical. Sensor batteries however have a fundamentally limited lifetime, due to prolonged sleep current and short high-power peaks, of 6-18 months generally and require significant replacements costs per sensor, adding up to an extremely high cost of ownership overall.

Sensors that are equipped with energy harvesting units are able to use standard kinetic energy or ambient energy for example from WiFi, 4G and GSM signals as a power source. As a result, the such sensors have a much longer maintenance-free lifetime as they require less battery replacements.

By using standard kinetic energy or ambient energy and preferably radio frequency signals as a power source, sensors can live forever. This creates a real plug and forget principle which means that sensors can be deployed without needing any future maintenance. This is an enabling innovation for countless IoT solutions to come.

Figure 1:
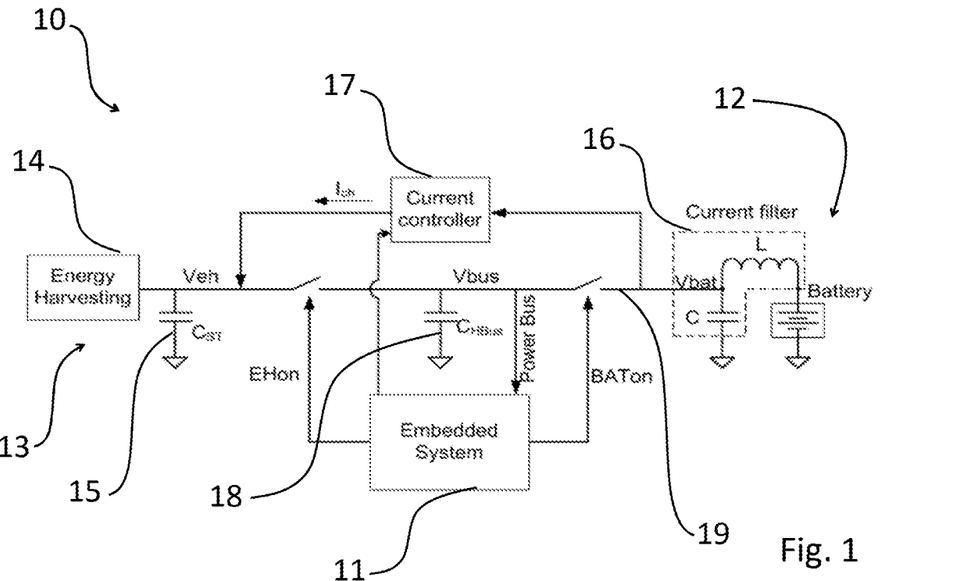
FIG. 1 shows a power supply control system according to a first aspect of the invention.

Such (IoT) sensors mostly have a (often large) period of in-activity and a (often short) period wherein the system is awake/up and running. During the low power sleep modus, the sensor will only require a very low amount of energy and hence will only draw a minimal current from the battery comprised energy source. However, during the wake or system running modus the energy requirement is however high and as such, the sensor, acting as a load for the power supply, draws high peaks of current from the battery. Conventionally, the power supply is provided by a battery, but more generally a battery is only one example of a unit in which energy can be stored. Such energy storage may also be done in a capacitor, super capacitor, or battery like unit. In general, a capacitor may be more suitable when a load connected thereto needs to provide huge energy spikes, e.g. high current peaks. Batteries leak less energy and are therefore used when the device needs to provide a steady flow of energy, hence, during the in-active sleep mode. In order to maintain a long battery lifetime, it is proposed to use a capacitor as alternative power supply during the high peak current when the system is up and running. It is however suggested that the capacitor is being charged not primarily by the battery, but by an energy harvesting unit that harvests (ambient, kinetic or electromagnetic) energy and converts it into a Direct Current, DC, signal to charge the capacitor with. This is shown in the example of FIG. 1. Which shows a power supply control system 10 according to a first aspect of the invention. The central unit of the power supply control system 10 is a hybrid system since it comprises two different types of power sources. The first power source 12 is at least one battery unit which can be a non-rechargeable or a rechargeable battery, that is arranged to be switched to a load for supplying electrical energy. The load is switched to the battery unit 12 by means of a switching element such as a transistor or (mos)fet or the like that is present in a power bus 19 between the battery and the load (not shown). The second power source 13 consists of an energy harvesting unit 14, as example an unit wherein Radio Frequency, RF, signal may be harvested with an antenna connected via a rectifier to the energy harvesting unit and wherein the antenna is arranged for receiving the RF signal, that is converted into a DC signal for charging a charge collecting unit such as one or more storage capacitor 15. The load, or several (serial or parallel) loads may alternate between a first low energy consuming operational modus and second high energy consuming operational modus. To supply either energy from one of the first 12 or second 13 power sources the system 10 comprises a unit 11 that is arranged to detect which mode the load is in and which (high or low) energy supply is needed. That unit 11 which may be present in the system 10 as an integrated circuit or embedded system or software alternative thereof, is also arranged to control the switching of the load between the power sources 12, 13. To this end, the unit 11 of the system 10 functions as a power source switching unit, connected to, or also comprising the operational modus detecting unit for receiving the detected first or second operational modus of the load, and being arranged to connect the first power source to the load when the load is being detected to be in a first low energy consuming operational modus, and is also arranged to connect the second power source to the load when the load is being detected to be in the second high energy consuming operational modus. In between the switching of the modes, the load may not be connected to both power sources 12, 13. To this end, the system 10 comprises a further charge collecting unit 18 such as one or more capacitor 18 in order to maintain the voltage of the power for a short period of time when no power source is connected. The capacitor 18 thus only needs a relative low capacity in the order between 1 nF and 10 nF. The storage capacitor 15 that is charged by the energy harvesting unit 14 is however of a higher capacity sufficient to provide energy during the start-up and awake mode of the load/sensor. That capacitor 15 for example 1 mF. The first energy source 12 further comprises a current filter 16 consisting of an LC circuit in which the L provided the smooth charging of the C and the C may provide (small) current peaks. In the event that the energy harvester does not have harvested sufficient energy to charge the capacitor 15, hence sufficient to provide power during the system running mode, the unit 11 may further enable a current controller 17 to charge the capacitor 15 with a limited amount of current originating from the battery.

Figure 2:
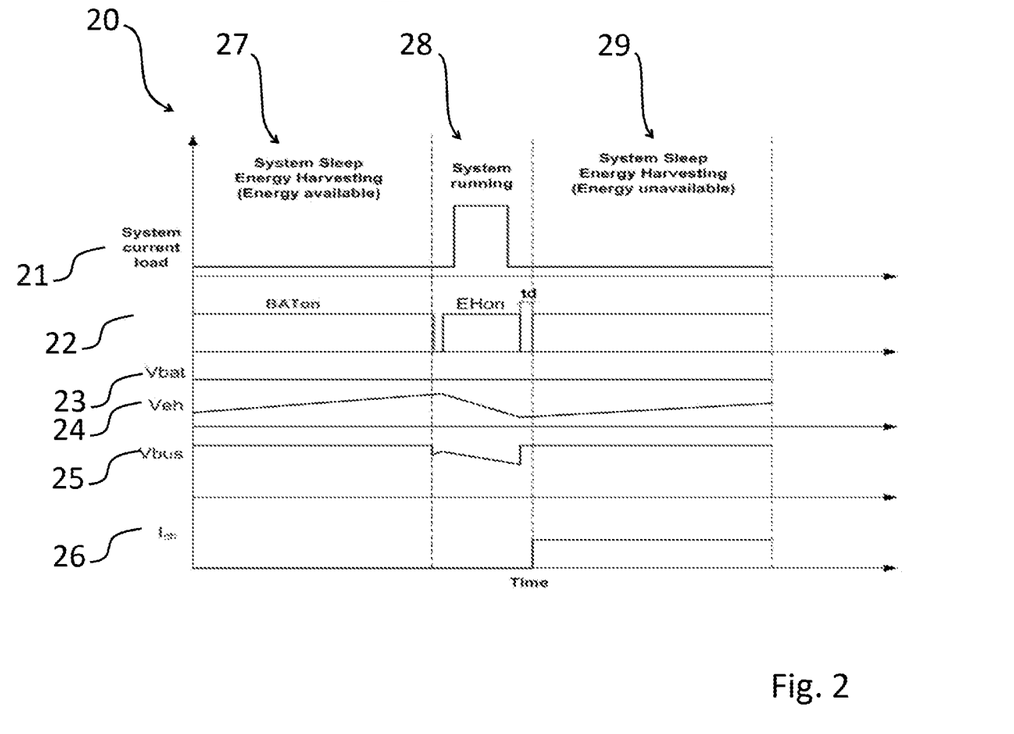
FIG. 2 shows a timing diagram according to the power supply control system of the first aspect of the invention.

In FIG. 2 the different stages and timing schedule 20 of the system components of the hybrid electrical power supply control system are shown. As can be seen, there are two different modes and the schedule 20 shows a transition from the system sleep mode 27 into a system running mode 28 and back to the system sleep mode 29 again. In the system sleep 27, 29 mode the battery provides the energy supply and during the system running the energy is supplied by the energy harvesting unit. Once the system running mode has lapsed, the energy harvesting unit may again continue to harvest energy for example by collecting and converting ambient energy in DC voltage. As can be seen, the battery is on 22 during the system sleep mode 27 and the energy harvesting unit supplies the system during running mode 28. These modes do not overlap and a small period of time no energy source is connected but the voltage level of the power bus is maintained by the voltage bus capacitor 18 as shown in FIG. 1. During the first system sleep period 27 the voltage level 24 of the energy harvesting unit increases and drops when current is drawn during the system running period 28, whereas the voltage level 24 rises back again once the energy harvesting unit continues to harvest energy in the second system sleep mode 29. The voltage level 25 of the power bus is steady during the first system sleep mode since it is powered by the battery in low current requiring sleep modes 27, 29. The voltage 25 however slightly drops once the system awakes 28 and the power is supplied by the storage capacitor 15 as shown in FIG. 1. As can be seen in FIG. 2 that storage capacitor 15 may be also charged by the current controller 17 if the storage capacitor 15 is unable to provide sufficient energy and thus has a low voltage level. Then the current Ich 26 starts to flow to charge the storage capacitor 15.

Figure 3:
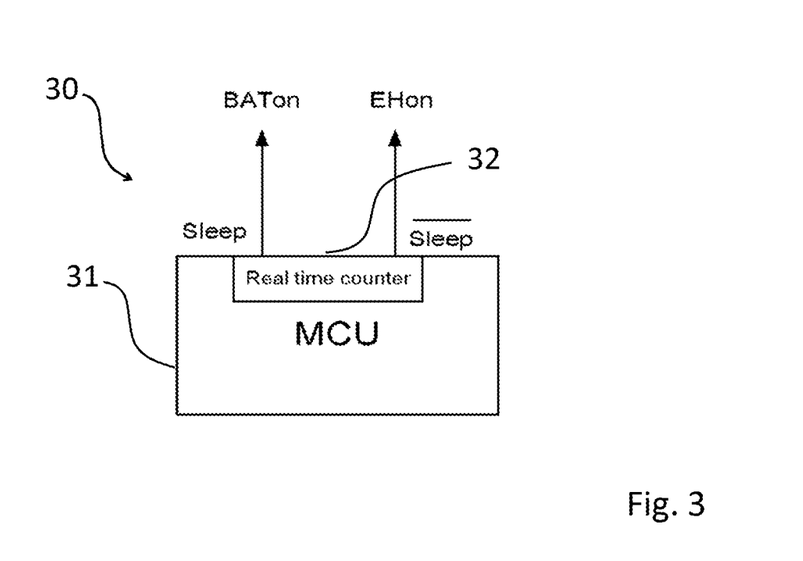
FIG. 3 shows a first example of switching means for switching between a first and second power source of a power supply control system according to a first aspect of the invention.
Figure 4:
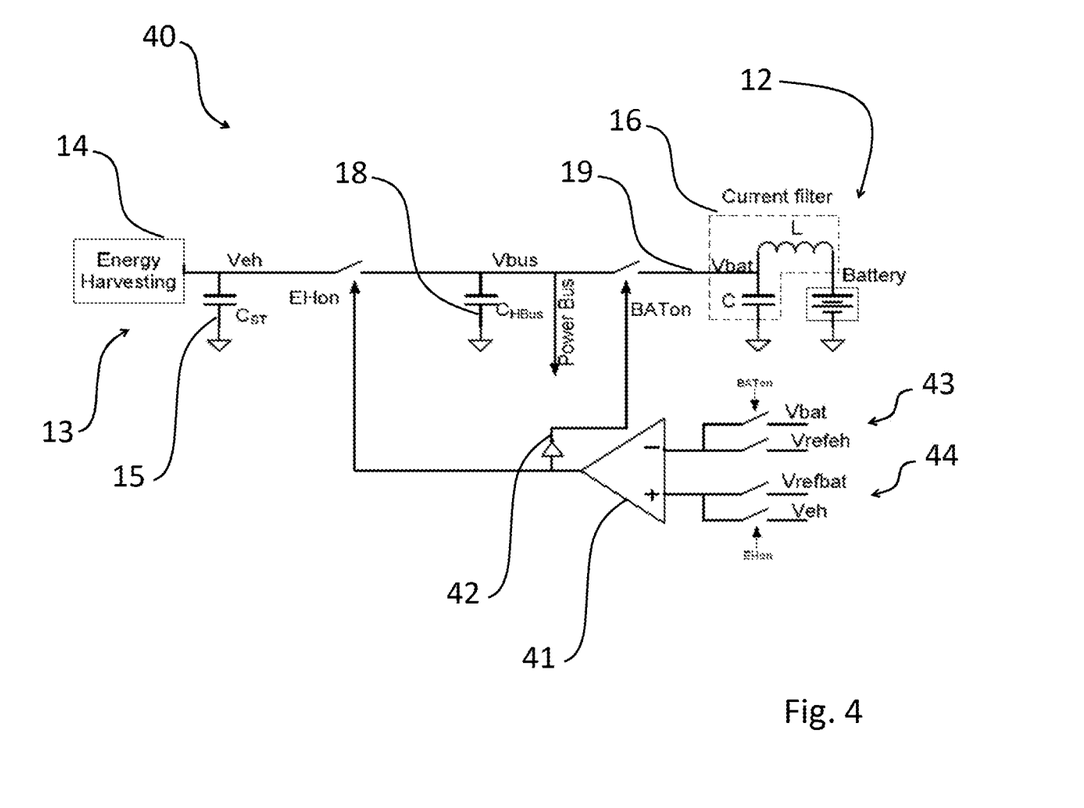
FIG. 4 shows a second example of switching means for switching between a first and second power source of a power supply control system according to a first aspect of the invention.

In FIGS. 3 and 4 two different examples are shown of selecting the energy sources and thus switching between the first 12 and second 13 energy source. In FIG. 3 there are two signals shown, BATon and EHon which indicate either an active battery 12 or energy harvesting 13 energy supply. These signals are generated by the presence of a microcontroller 31 equipped with a real-time counter that counts a certain predetermined time period in which it is expected that the system will be either in sleep or awake mode. The microcontroller 31 may be equipped with a voltage measuring unit to measure the voltage of the storage capacitor 15 and to determine if the voltage is enough to supply the peak current needed during the active mode.

In FIG. 4 an alternative solution is presented wherein no real-time counter is required but wherein the power source switching unit 10 may also comprise a comparator 41, for example an operational amplifier 41 that compares at least two 43, 44 input voltages to switch between the first 12 and second 13 power source when the voltage of one of the inputs 43, 44 exceeds a second input, and switches back to the other state when the second input voltage exceeds the first.

Figure 5:
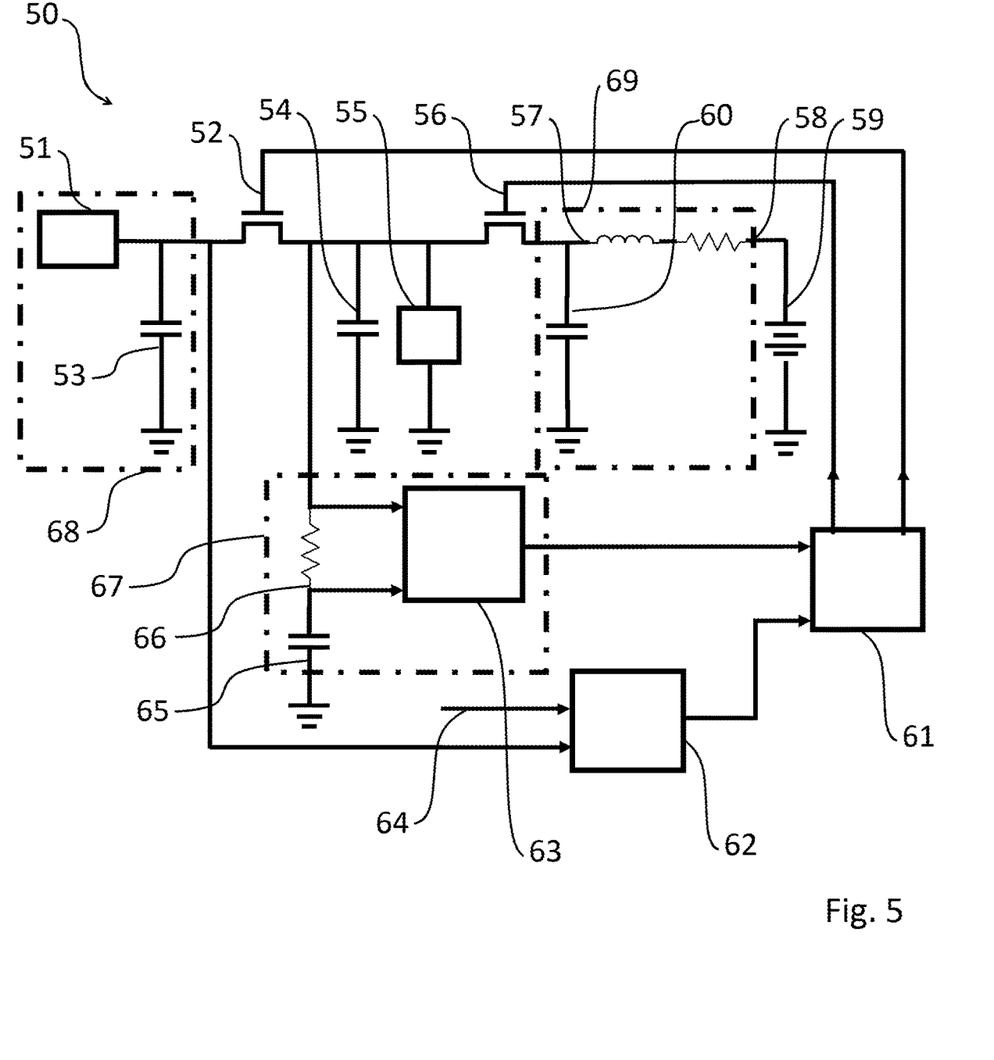
FIG. 5 shows a third example of switching means for switching between a first and a second power source of a power supply control system according to a further aspect of the invention.

In FIG. 5 yet another example of invention is presented. This example shows a hybrid electrical power supply control system 50 for providing electrical energy to at least one load 55. The load 55 switch between a first low energy consuming operational modus and second high energy consuming operational modus. In the low energy consuming operation modus, the load 55, e.g. an Internet of Things sensor or IoT device in general, is in sleep modus. In the high energy modus the load 55 is awake, for example to transmit sensed data over a wireless communication channel.

The system 50 comprises a first power source having at least one battery unit 59 for providing power to the load 55. The system 50 also comprises a second power source having at least one energy harvesting unit 51 such as a solar cell and arranged to harvest and convert energy into Direct Current, DC, energy for providing power to the load 55. The charge from the energy harvester 51 is stored in a charge collecting unit 53.

The system 50 also consists of an operational modus detecting unit, which detects if the load is awake or in sleep. This may be embodied by the current peak detector 67. The current peak detector may consist of a resistor 66 a conductor 65, and a comparator 63 which measures the voltage over the resistor 66. When the load 55 is in wake-up modus, it will result a peak current being drawn by the load 55 and current will start to flow through the resistor 66, which will create a voltage differential over the resistor 66 which can be detected by the comparator 63.

If the current peak detector 67 detects that load 55 will enter into the high power operation modus, i.e. the wake-up modus, the power source switching unit to switch from the battery 59 power supply to the charge collecting unit 53 of the second power source 68. This is embodied by operating the switches 52 and 56, i.e. to open 56 and close switch 52.

By closing both switches 52 and 56 the battery 59 of the first power supply is connected to the charge collecting unit 53 or super capacitor of the second power supply 68. To prevent high currents which will have a negative effect on the lifetime of the battery, the system is provided with a current filter 69 which consists of a capacitor 60, coil 57 and a resistor 58.

The system 50 according to the example shown in FIG. 5 switches between both power supplies when a high current is detected by the current peak detector 67 and when the voltage at the output of the second power supply 68 drops below the reference voltage 64. This is detected by comparator 62 an input to the non-overlapping circuit 61 to control the switches 52 and 56 to change between the first and second power supply and charging of the capacitor 53 by the battery 59. In order to smoothen the transition between these different modi, the system may comprise a further capacitor 54.

Figure 6:
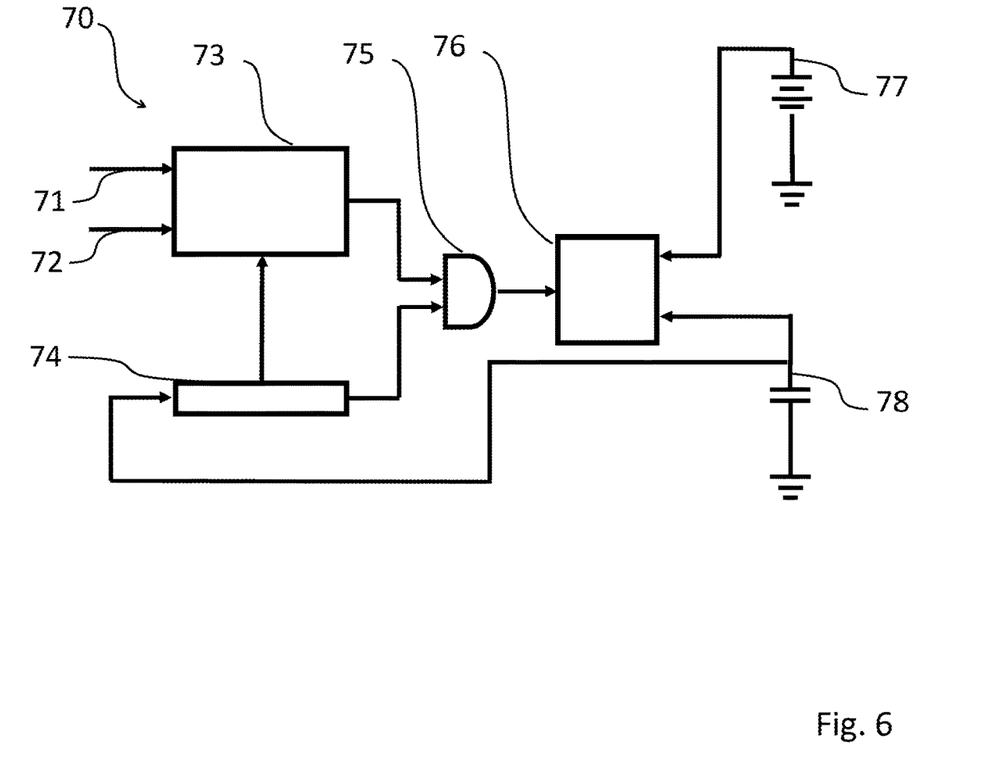
FIG. 6 shows an example of a control circuit for switching between the first and second power supply.

In FIG. 6 a control circuit or energy outage detection circuit 70 is shown. The circuit 70 is arranged to determine when to switch between the two types of power supplies, i.e. the battery 77 and the super capacitor 78 or energy storage unit. The circuit 70 is further arranged to charge the super capacitor 78 with the battery 77 when no or insufficient energy is harvested by the energy harvester for storage of that energy in the super capacitor. The super capacitor only charges from the battery if the voltage monitor 74 detects a low voltage condition and 75 when the state machine 73 detects that the super capacitor is already low for some time, i.e. on the basis of a wakeup signal 71 and a timer or clock signal 72.

Figure 7:
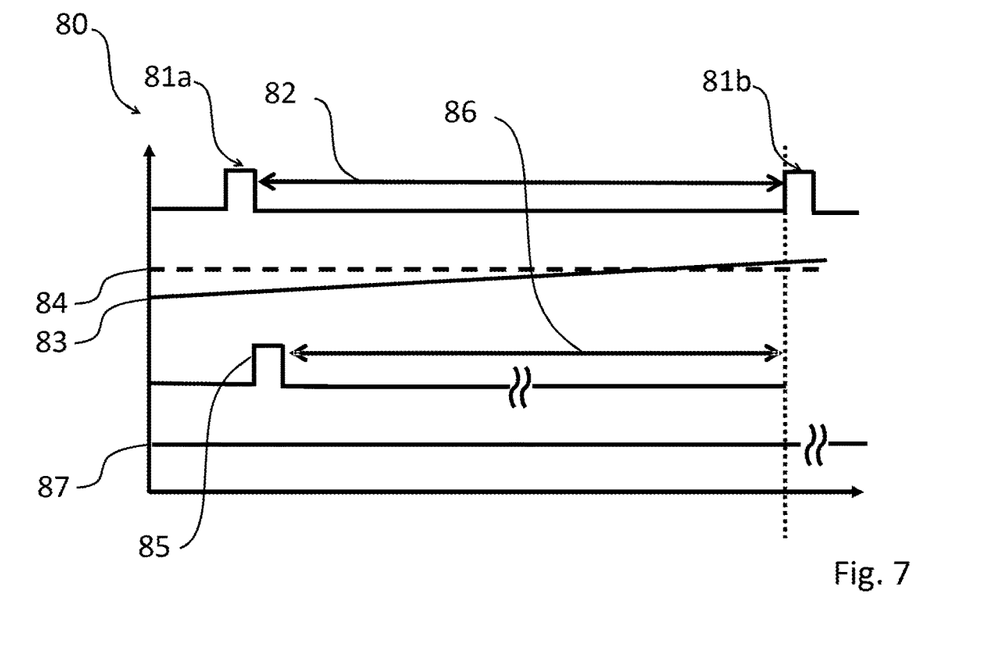
FIG. 7 shows a time diagram corresponding to the example demonstrated in FIG. 6.

In FIG. 7 a time diagram is shown that corresponds to the example as demonstrated in FIG. 6 and described above. On the vertical axes of the diagram several signals are shown and the time, i.e. on the horizontal axes, in which these signals become active.

The system may operate in a first and a second modus. In the first modus, the low power modus, the system is in sleep mode and consumes little energy. During this modus, the system's power is supplied by the battery. In the second modus, the high power modus, the system is awake/woken up and consumes more power which may result in a high current being drawn from the power supply. During this modus, the power is supplied from a charge collecting unit such as super capacitor. During this period, the system will for example transmit data wirelessly, in which the system consumes, for a short time period, a relatively large amount of energy. The time period for the low power modus is most often much larger than that of the high power modus. This is also indicted in FIG. 7, which shows a data transmission interval 82 between the two data transmissions actions 81a and 81b. In this interval 82, a wake-up signal 85 is provided to the system to start the time count 86. This time count 86 is proportional to data transmission interval and may for example be set at 90% thereof. When the time count is done, i.e. when the timer has expired, the charge collecting unit or super capacitor voltage 83 is compared to a reference voltage 84 to see if the capacitor is charge sufficiently. If the voltage 83 is lower than the reference 84, the capacitor may be charged by the battery by operating the corresponding switches. In the example shown in FIG. 7 the capacitor is sufficiently charged and has exceeded the reference voltage 84 before the timer 86 expired. Hence, the capacitor does not need to be charged by the battery, as indicated in the switch signal 87 which remains low for the full time period.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A hybrid electrical power supply control system for providing electrical energy to at least one load, said load alternating between a first low energy consuming operational modus and second high energy consuming operational modus, and wherein said control system comprises:
    a first power source comprising at least one battery unit and arranged to be switched to said load for supplying electrical energy;
    a second power source comprising at least one energy harvesting unit and arranged to harvest and convert energy into Direct Current, DC, energy, and wherein said converted DC energy is stored in a charge collecting unit, and wherein said second power source is further arranged to be switched to said load for supplying electrical energy;
    some operational modus detecting unit, arranged for detecting whether said load being in said first or in said second operational modus;
    a power source switching unit, connected to said operational modus detecting unit for receiving said detected first or second operational modus of said load, and arranged to connect said first power source to said load upon said load being detected to be in said first low energy consuming operational modus, and arranged to connect said second power source to said load upon said load being detected to be in said second high energy consuming operational modus, wherein said second high energy consuming operational modus is defined by said operational modus detecting unit detecting a current peak drawn by said load, and wherein said power source switching unit is further arranged to charge the charge collecting unit of said second power source with said at least one battery unit of said first power source;
        wherein said power source switching unit comprises a microcontroller having a real time counter unit and being arranged to determine a voltage level over said charge collecting unit, and wherein said power source switching unit is arranged to switch from said first to said second power sources upon both said real time counter unit exceeding a predetermined value and said determined voltage level over said charge collecting unit exceeding a predetermined threshold value; or wherein said power source switching unit comprises a comparator having said determined voltage level of said first power source, said determined voltage level of said second power source, and said corresponding predetermined threshold values connected to inputs of said comparator and wherein said comparator output is connected said first and second power source for switching between said first to said second power sources in correspondence with said voltage levels of said comparator inputs.

2. The hybrid electrical power supply control system according to claim 1, wherein said power source switching unit is arranged to compare a voltage level Veh of said charge collecting unit with a predetermined reference voltage level Vref, and wherein said power source switching unit being further arranged to charge said charge collecting unit with said at least one battery unit of said first power source when Veh drops below Vref.

3. The hybrid electrical power supply control system according to claim 2, wherein said power source switching unit is further arranged to charge said charge collecting unit with said at least one battery unit of said first power source when a real time counter finishes a first low energy time counter.

4. The hybrid electrical power supply control system according to claim 2, wherein said power source switching unit is further arranged to charge said charge collecting unit with said at least one battery unit of said first power source when an external wakeup signal is received.

5. The hybrid electrical power supply control system according to claim 1, wherein said operational modus detecting unit is arranged for detecting a current peak drawn by said load based on a voltage differential over an electrical resistance.

6. The hybrid electrical power supply control system according to claim 1, wherein said operational modus detecting unit comprises an electrical resistance and an in series connected capacitance.

7. The hybrid electrical power supply control system according to claim 1, wherein said energy harvesting unit is arranged to harvest energy from an external source, and wherein said external source comprises any one or more of the group consisting of: ambient energy, kinetic energy, solar power, thermal energy, wind energy, salinity gradients and energy from electromagnetic radiation.

8. The hybrid electrical power supply control system according to claim 1, wherein said energy harvesting unit is arranged to convert incident radio frequency, RF, energy associated with an RF signal to Direct Current, DC, energy, wherein said converted DC energy is stored in a charge collecting unit, and arranged to be switched to said load for supplying electrical energy.

9. The hybrid electrical power supply control system according to claim 1, wherein said power source switching unit is arranged to compare a voltage level $V_{eh}$ of said charge collecting unit with a predetermined reference voltage level $V_{ref}$, said power source switching unit being further arranged to charge said charge collecting unit by said battery unit of said first power source when $V_{eh}$ drops below $V_{ref}$, and to charge said charge collecting unit by said energy harvesting unit of said second power source when $V_{eh}$ exceeds $V_{ref}$.

10. The hybrid electrical power supply control system according to claim 1, wherein said control system further comprises a power source bus for connecting said load and wherein said power source bus is alternately connectable to said first and second power sources, through control of said power source switching unit.

11. The hybrid electrical power supply control system according to claim 10, wherein said power source bus comprises a further charge collecting unit for maintaining a voltage level of said power source bus upon said power source switching unit switching said power source bus between said first and second power source.

12. The hybrid electrical power supply control system according to claim 11, wherein at least one of said charge collecting unit and said further charge collecting unit comprise a storage capacitor.

13. The hybrid electrical power supply control system according to claim 1, wherein said control system further comprises a current controlling unit for charging said charge collecting unit by said battery of said first power source at a predetermined limited current level.

14. The hybrid electrical power supply control system according to claim 1, wherein said first power source further comprises a current filter for limiting said current being drawn from said battery by a predetermined limited current level, and wherein said current filter in particular is comprised of an LC circuit.

15. The hybrid electrical power supply control system according to claim 1, wherein said predetermined threshold value of said charge collecting unit corresponds to a predetermined peak current drawn by said load in said second high energy consuming operational modus.

16. The hybrid electrical power supply control system according to claim 1, wherein said power source switching unit is arranged to determine a voltage level of said first power source and further being arranged to switch from said first to said second power sources upon said determined voltage level of said first power source to drop below a predetermined threshold value.

17. A method of controlling a hybrid electrical power supply system for providing electrical energy to a load, said load alternating between a first low energy consuming operational modus and second high energy consuming operational modus, and wherein said hybrid electrical power system comprises a first power source comprising at least one battery unit being arranged to be switched to said load for supplying electrical energy, and a second power source comprising at least one energy harvesting unit and arranged to harvest and convert energy into Direct Current, DC, energy, and wherein said converted DC energy is stored in a charge collecting unit, and wherein said second power source is further arranged to be switched to said load for supplying electrical energy, said method comprising the steps of:

detecting, by an operational modus detecting unit, an operational modus of said load being in said first low energy consuming operational modus or in said second high energy consuming operational modus;

receiving, by a power source switching unit being connected to said operational modus detecting unit, said detected first or second operational modus of said load;

connecting, by said power source switching unit, said first power source to said load upon said load being detected to be in said first low energy consuming operational modus;

connecting, by said power source switching unit, said second power source to said load upon said load being detected to be in said second high energy consuming operational modus;

wherein said power source switching unit comprises a microcontroller having a real time counter unit;

determining, by said microcontroller a voltage level over said charge collecting unit, and wherein said power source switching unit is arranged to switch from said first to said second power sources upon both said real time counter unit exceeding a predetermined value and said determined voltage level over said charge collecting unit exceeding a predetermined threshold value; or wherein said power source switching unit comprises a comparator having said determined voltage level of said first power source, said determined voltage level of said second power source, and said corresponding predetermined threshold values connected to inputs of said comparator and wherein said comparator output is connected said first and second power source;

switching, by said comparator, between said first to said second power sources in correspondence with said voltage levels of said comparator inputs.

18. A sensor device comprising:

a hybrid electrical power supply control system for providing electrical energy to at least one load, said load alternating between a first low energy consuming operational modus and second high energy consuming operational modus, and wherein said control system comprises:

a first power source comprising at least one battery unit and arranged to be switched to said load for supplying electrical energy;

a second power source comprising at least one energy harvesting unit and arranged to harvest and convert energy into Direct Current, DC, energy, and wherein said converted DC energy is stored in a charge collecting unit, and wherein said second power source is further arranged to be switched to said load for supplying electrical energy;

some operational modus detecting unit, arranged for detecting whether said load being in said first or in said second operational modus;

a power source switching unit, connected to said operational modus detecting unit for receiving said detected first or second operational modus of said load, and arranged to connect said first power source to said load upon said load being detected to be in said first low energy consuming operational modus, and arranged to connect said second power source to said load upon said load being detected to be in said second high energy consuming operational modus, wherein said second high energy consuming operational modus is defined by said operational modus detecting unit detecting a current peak drawn by said load, and wherein said power source switching unit is further arranged to charge the charge collecting unit of said second power source with said at least one battery unit of said first power source;

a sensor for performing a measurement;

an energy harvesting unit arranged to harvest and convert energy into Direct Current, DC, energy, wherein said converted DC energy is stored in a charge collecting unit, and wherein said second power source is further arranged to be switched to said sensor for supplying electrical energy thereto; and wherein said power source switching unit comprises a microcontroller having a real time counter unit and being arranged to determine a voltage level over said charge collecting unit, and wherein said power source switching unit is arranged to switch from said first to said second power sources upon both said real time counter unit exceeding a predetermined value and said determined voltage level over said charge collecting unit exceeding a predetermined threshold value; or wherein said power source switching unit comprises a comparator having said determined voltage level of said first power source, said determined voltage level of said second power source, and said corresponding predetermined threshold values connected to inputs of said comparator and wherein said comparator output is connected said first and second power source for switching between said first to said second power sources in correspondence with said voltage levels of said comparator inputs.

19. The sensor device according to claim 18, wherein said energy harvesting unit comprises an antenna connected to via rectifier to said energy harvesting unit of said hybrid electrical power supply control system, wherein said antenna is arranged for receiving said RF signal.

\* \* \* \* \*